US011884321B2

(12) United States Patent
Omikawa

(10) Patent No.: US 11,884,321 B2
(45) Date of Patent: Jan. 30, 2024

(54) VEHICULAR SELF-DIAGNOSIS DEVICE

(71) Applicant: SUBARU CORPORATION, Tokyo (JP)

(72) Inventor: Takashi Omikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 190 days.

(21) Appl. No.: 17/494,058

(22) Filed: Oct. 5, 2021

(65) Prior Publication Data

US 2022/0105983 A1 Apr. 7, 2022

(30) Foreign Application Priority Data

Oct. 5, 2020 (JP) .................... 2020-168707

(51) Int. Cl.
*B62D 15/02* (2006.01)
*B62D 5/04* (2006.01)
(52) U.S. Cl.
CPC ........... *B62D 15/025* (2013.01); *B62D 5/049* (2013.01)
(58) Field of Classification Search
CPC .............................. B62D 15/025; B62D 5/049
See application file for complete search history.

(56) References Cited

U.S. PATENT DOCUMENTS

| 10,762,786 | B1* | 9/2020 | Dewey | G06Q 40/08 |
|---|---|---|---|---|
| 2013/0253767 | A1* | 9/2013 | Lee | B60W 50/04 |
|  |  |  |  | 701/41 |
| 2015/0329140 | A1* | 11/2015 | Tamaizumi | B62D 6/02 |
|  |  |  |  | 701/42 |
| 2018/0158260 | A1* | 6/2018 | Dudar | B62D 15/026 |
| 2018/0178839 | A1* | 6/2018 | Ide | B62D 15/029 |
| 2019/0255971 | A1* | 8/2019 | Sakato | B60N 2/0244 |
| 2020/0079372 | A1* | 3/2020 | Hajika | B60W 30/12 |
| 2020/0079394 | A1* | 3/2020 | Masuda | B60R 16/02 |
| 2020/0079421 | A1* | 3/2020 | Kano | B62D 5/0484 |

FOREIGN PATENT DOCUMENTS

JP 2019-162918 A 9/2019

* cited by examiner

*Primary Examiner* — Jeff A Burke
*Assistant Examiner* — Mohamad O El Sayah
(74) *Attorney, Agent, or Firm* — TROUTMAN PEPPER HAMILTON SANDERS LLP

(57) ABSTRACT

A vehicular self-diagnosis device includes first to third sensors that detect parameters to be used in steering control of a vehicle, first to third turn estimators that respectively estimate turn statuses of the vehicle based on a steering angle detected by the first sensor, vehicle behavior detected by the second sensor, and a lane curvature and a vehicle-versus-lane yaw angle of the vehicle relative to the lane curvature detected by the third sensor, an offset extractor that extracts first to third offset components respectively from signals indicating the estimated turn statuses, an offset-divergence-amount calculator that calculates a maximum divergence amount based on maximum and minimum values of the first to third offset components, and a comparison unit that compares the maximum divergence amount with a predetermined threshold value and determines that inconsistency exists among the first to third sensors if the maximum divergence amount exceeds the threshold value.

13 Claims, 8 Drawing Sheets

VEHICULAR SELF-DIAGNOSIS DEVICE

CROSS-REFERENCE TO RELATED APPLICATION

The present application claims priority from Japanese Patent Application No. 2020-168707 filed on Oct. 5, 2020, the entire contents of which are hereby incorporated by reference.

BACKGROUND

The disclosure relates to vehicular self-diagnosis devices that self-diagnose inconsistency among sensors that detect parameters to be used in steering control.

Known examples of a steering support function include active lane keep (ALK) control that involves causing an automobile to recognize a travel lane and assisting in a steering operation to cause the automobile to travel along the center of the travel lane, and lane departure prevention (LDP) control that involves performing steering control to cause a vehicle to travel along boundary lines (lane lines) by actively intervening in a steering operation if it is predicted that the vehicle may deviate from a boundary line (i.e., lane line).

Such a steering support function involves estimating the turn status of the vehicle by using parameters obtained from various sensors, and generating an appropriate control output suitable for each function. For example, Japanese Unexamined Patent Application Publication No. 2019-162918 discloses steering support control for assisting in a steering operation of the driver. This steering support control involves setting a target travel path on which a vehicle is to travel to the center of a lane and specifically driving an electric power steering (EPS) motor based on a vehicle-front travel environment recognized by a sensor, such as either one of a camera and a radar, such that the vehicle travels along the target travel path.

In this case, known examples of a method for estimating the turn status of the vehicle include a method of estimating the turn status based on a steering angle acquired from a steering angle sensor or from a rotational angle of the EPS motor, a method of estimating the turn status based on a yaw rate detected by a yaw rate sensor, and a method of estimating the turn status based on a curvature of a lane (i.e., lane curvature) that is acquired by an imaging device, such as a camera, and on which the vehicle is to travel and also based on a yaw angle (i.e., vehicle-versus-lane yaw angle) of the vehicle relative to the lane curvature. It is also possible to estimate the turn status based on lateral acceleration detected by a lateral acceleration sensor.

SUMMARY

An aspect of the disclosure provides a vehicular self-diagnosis device including first to third sensors, a first turn estimator, a second turn estimator, a third turn estimator, an offset extractor, an offset-divergence-amount calculator, and a comparison unit. The first to third sensors are configured to detect parameters to be used in steering control of a vehicle. The first turn estimator is configured to estimate a first turn status of the vehicle based on a steering angle detected by the first sensor as one of the parameters. The second turn estimator is configured to estimate a second turn status of the vehicle based on behavior of the vehicle detected by the second sensor as one of the parameters. The third turn estimator is configured to estimate a third turn status of the vehicle based on a lane curvature and a vehicle-versus-lane yaw angle of the vehicle relative to the lane curvature. Each of the lane curvature and the vehicle-versus-lane yaw angle is detected by the third sensor as one of the parameters. The offset extractor is configured to extract first to third offset components respectively from signals indicating the first to third turn statuses of the vehicle estimated by the first to third turn estimators. The offset-divergence-amount calculator is configured to calculate a maximum divergence amount based on a maximum value of the first to third offset components and a minimum value of the first to third offset components. The comparison unit is configured to compare the maximum divergence amount calculated by the offset-divergence-amount calculator with a predetermined threshold value and determine that inconsistency exists among the first to third sensors in a case where the maximum divergence amount exceeds the threshold value.

An aspect of the disclosure provides a vehicular self-diagnosis device including first to third sensors and circuitry. The first to third sensors are configured to detect parameters to be used in steering control of a vehicle. The circuitry is configured to estimate a first turn status of the vehicle based on a steering angle detected as one of the parameters. The circuitry is configured to estimate a second turn status of the vehicle based on behavior of the vehicle detected as one of the parameters. The circuitry is configured to estimate a third turn status of the vehicle based on a lane curvature and a vehicle-versus-lane yaw angle of the vehicle relative to the lane curvature. Each of the lane curvature and the vehicle-versus-lane yaw angle is detected as one of the parameters. The circuitry is configured to extract first to third offset components respectively from signals indicating the first to third estimated turn statuses of the vehicle. The circuitry is configured to calculate a maximum divergence amount based on a maximum value and a minimum value of the first to third offset components. The circuitry is configured to compare the calculated maximum divergence amount with a predetermined threshold value and determine that inconsistency exists among the first to third sensors in a case where the maximum divergence amount exceeds the threshold value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 8:
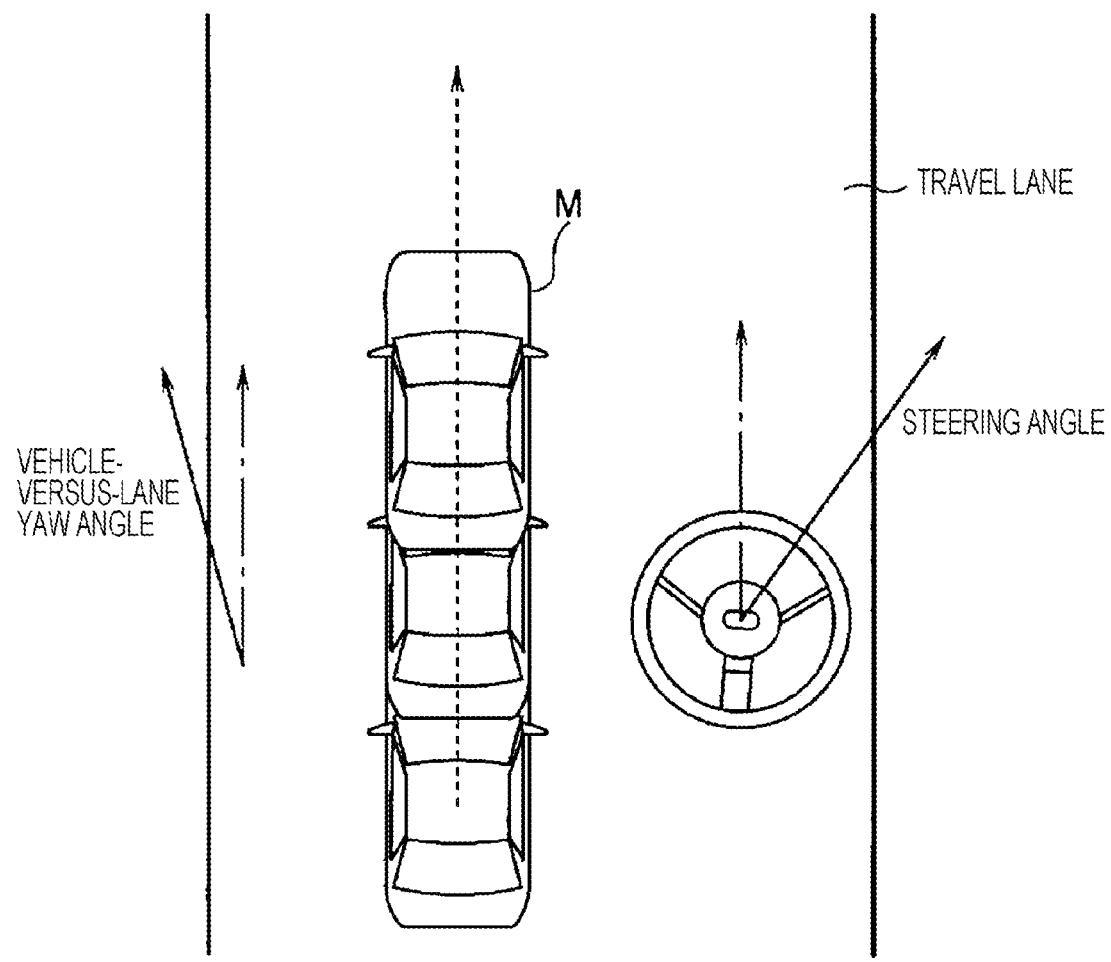
FIG. 8 illustrates inconsistency between a steering angle and a vehicle-versus-lane yaw angle when a vehicle in the related art is traveling on a straight road.

When the turn status of a vehicle is to be estimated, there is inconsistency among various sensors. For example, as illustrated in FIG. 8, even if the vehicle travels along a travel lane of a straight road, the steering angle detected by the steering angle sensor and the vehicle-versus-lane yaw angle acquired based on the image captured by the camera may sometimes be not zero. Thus, in order to continue executing the steering support function while the vehicle is traveling, it is desirable to constantly monitor whether the sensors being used are outputting proper values.

Figure 9:
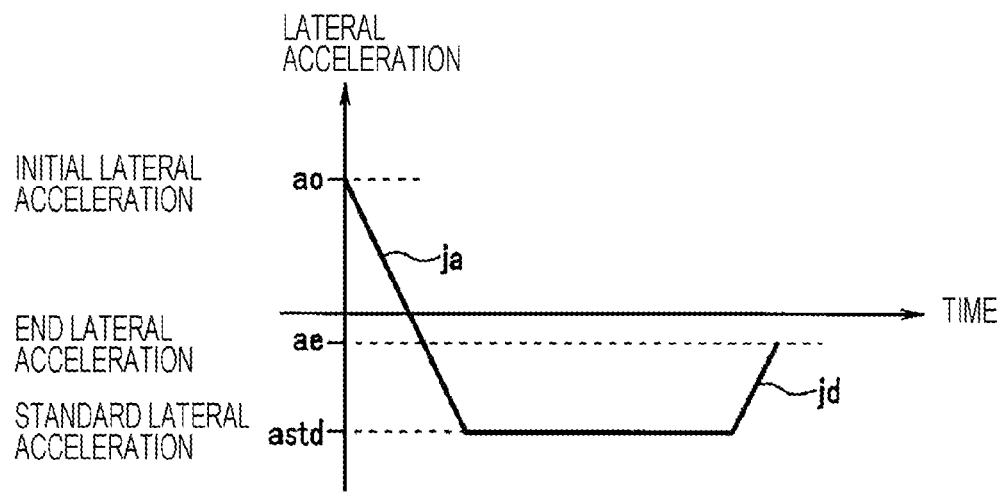
FIG. 9 is a timing chart illustrating a lane-departure-prevention control pattern based on lateral acceleration.
Figure 10:
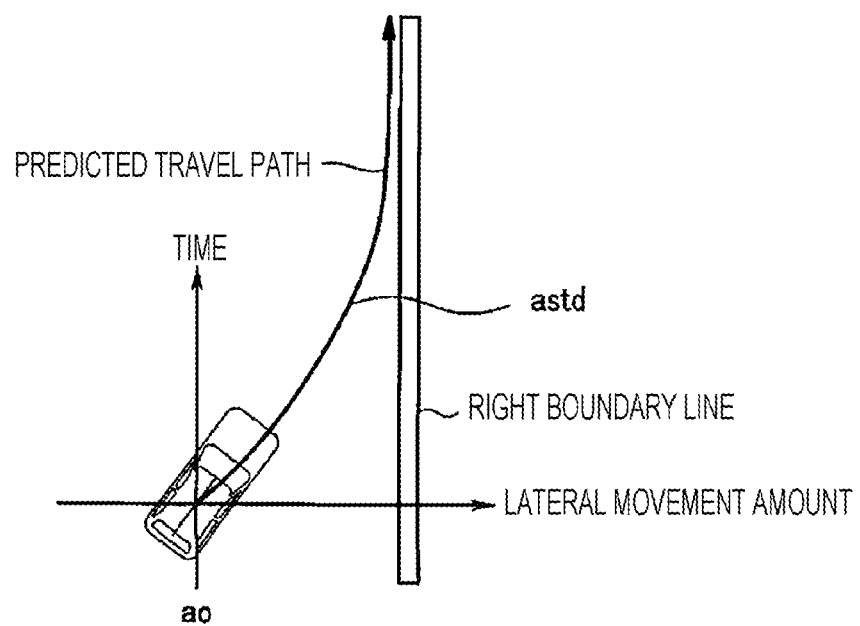
FIG. 10 illustrates a predicted travel path according to lane-departure-prevention control in the related art.

For example, the LDP control as a steering support function involves creating a lane-departure-prevention trajectory (predicted travel path), as illustrated in FIG. 10, on the basis of a lane-departure-prevention control pattern (abbreviated as "control pattern" hereinafter) based on target trapezoidal-wave lateral acceleration for the steering control, as illustrated in FIG. 9, giving an instruction about a steering angle according to the lane-departure-prevention trajectory to an EPS device, and driving the EPS motor, thereby controlling the traveling of the vehicle. In FIG. 9, initial lateral acceleration ao is vehicle-versus-lane lateral acceleration (=predicted lateral acceleration−actual lateral acceleration), standard lateral acceleration astd is lateral acceleration that causes the vehicle to turn in a state where the lateral acceleration is fixed (lateral acceleration≠0), and end lateral acceleration ae is lateral acceleration at the end of the lane-departure-prevention control. Furthermore, this control pattern has steer-turn jerk ja set from the initial lateral acceleration ao to the standard lateral acceleration astd and steer-turn-back jerk jd set from the standard lateral acceleration astd to the end lateral acceleration ae.

If the initial lateral acceleration ao exceeds the standard lateral acceleration astd, the steering operation is not to be intervened since a turn component used for the lane departure prevention is already generated in the vehicle. The initial lateral acceleration ao is a difference between predicted lateral acceleration converted from the lane curvature recognized by the sensor, such as the camera, and actual lateral acceleration estimated from the steering angle detected by the steering angle sensor. In other words, the initial lateral acceleration ao is vehicle-versus-lane lateral acceleration (=predicted lateral acceleration−actual lateral acceleration).

In a case where this sensor has a steady-state deviation and detects a wrong lane curvature, if it is falsely determined that the initial lateral acceleration ao has exceeded the standard lateral acceleration astd even though the initial lateral acceleration ao has not actually exceeded the standard lateral acceleration astd, the intervention in the steering operation according to the LDP control is not executed. Moreover, in a case where the steering angle sensor has an error in steering-angle neutral learning and estimates a wrong neutral point, a similar problem may occur.

It is desirable to provide a vehicular self-diagnosis device that can detect inconsistency among sensors configured to detect parameters to be used when executing a steering support function and that can properly detect whether the inconsistency has exceeded a permissible value.

Figure 1:
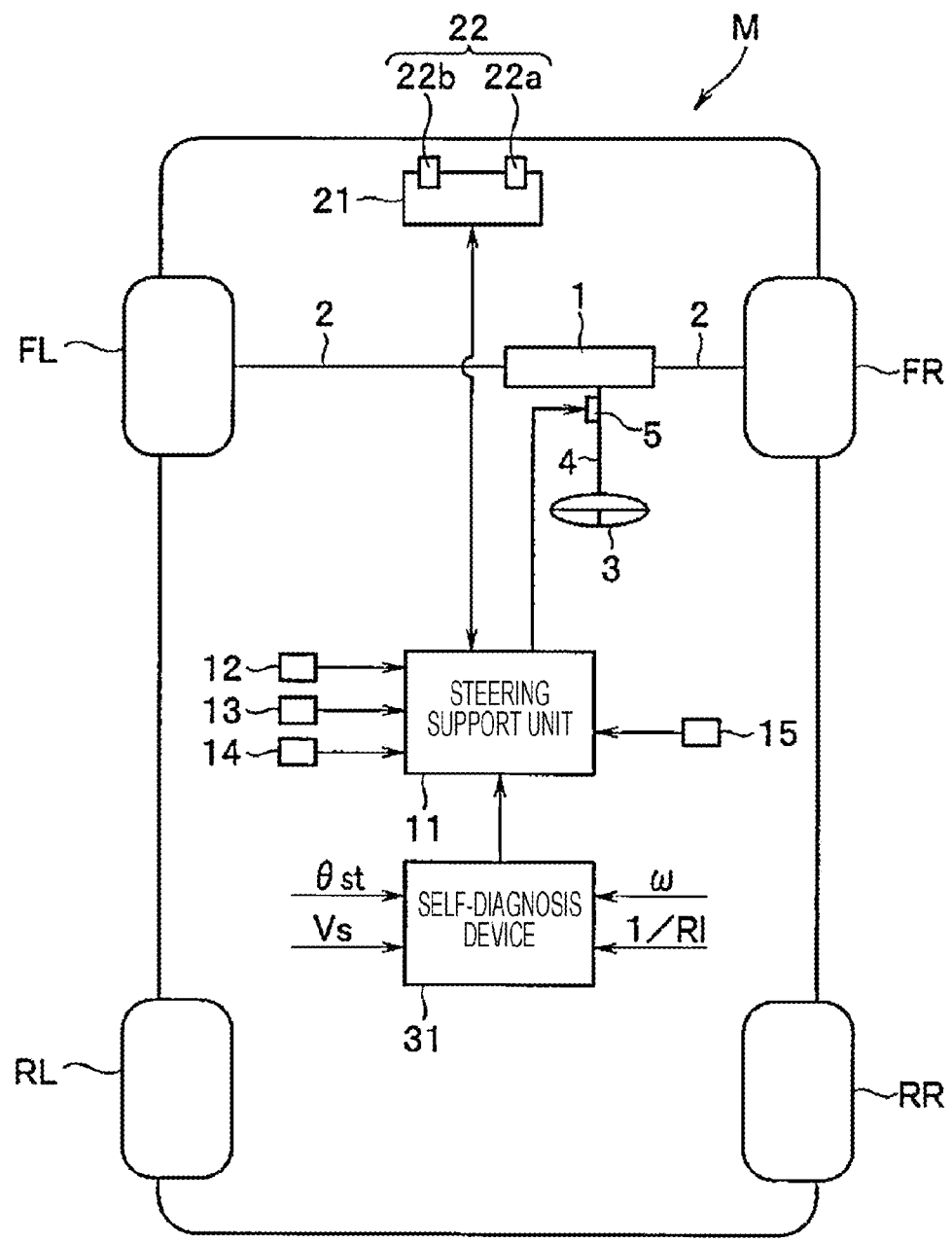
FIG. 1 schematically illustrates the configuration of a relevant part of a vehicle equipped with a steering support device.

An embodiment of the disclosure will be described below with reference to FIG. 1 to FIG. 7. In FIG. 1, a vehicle M has left and right front wheels FL and FR and left and right rear wheels RL and RR. The left and right front wheels FL and FR are coupled to a steering mechanism 1, such as a rack-and-pinion mechanism, by using a tie rod 2. The steering mechanism 1 is coupled to a steering shaft 4 having a steering wheel 3 fixed to the distal end thereof. The steering shaft 4 is coupled to an electric power steering (EPS) motor 5 with a transmission mechanism (not illustrated) interposed therebetween. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The vehicle M is equipped with a steering support unit 11. The steering support unit 11 is constituted of a microcomputer including a central processing unit (CPU), a random access memory (RAM), and a read only memory (ROM), and peripheral devices thereof. In the ROM, a control program for realizing operation set for each system, and fixed data, such as a table and a map, are stored. The steering support unit 11 executes known active lane keep (ALK) control and known lane departure prevention (LDP) control. In one embodiment, the steering support unit 11 may serve as a "steering supporter".

The input side of the steering support unit 11 is coupled to various sensors that detect the behavior of the vehicle M. Examples of the various sensors include a steering torque sensor 12, a vehicle speed sensor 13 that detects the vehicle speed of the vehicle M, a yaw rate sensor 14 that detects a yaw rate and lateral acceleration as behavior occurring in the vehicle body, and a steering angle sensor 15 that detects a steering angle Est from the rotational angle of the steering shaft 4. The steering torque sensor 12 is attached to the steering shaft 4 and detects a steering torque applied to the steering wheel 3. In one embodiment, the yaw rate sensor 14 may serve as a "second sensor", and the steering angle sensor 15 may serve as a "first sensor".

Figure 2:
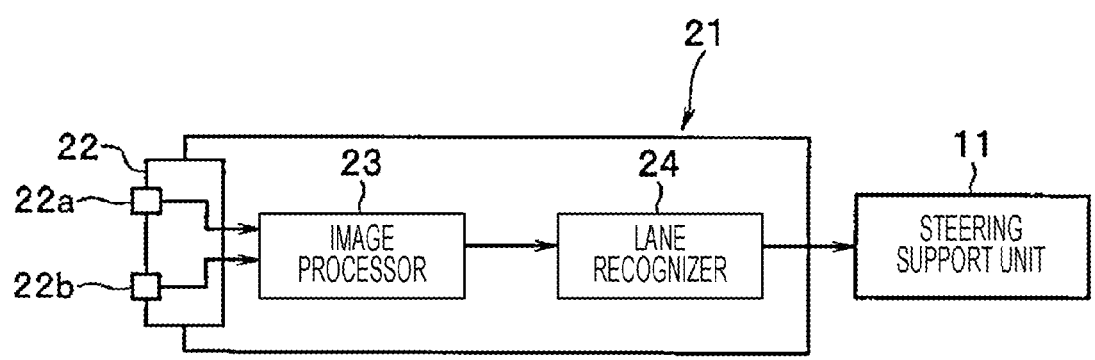
FIG. 2 is a functional block diagram of a camera unit.

Reference sign 21 denotes a camera unit and has a vehicular camera 22 constituted of a stereo camera including a main camera 22a and a sub camera 22b. In one embodiment, the camera unit may serve as a "third sensor". Moreover, as illustrated in FIG. 2, the camera unit 21 contains an image processor 23 and a lane recognizer 24. Both cameras 22a and 22b are disposed in a horizontal state above a room mirror inside the vehicle M and are located close to the windshield at positions equally spaced apart toward the left and right sides from the center in the vehicle width direction.

Furthermore, each of these cameras 22a and 22b is provided with a color imaging element equipped with a color charge-coupled device (CCD) or a color complementary metal oxide semiconductor (CMOS). The two color imaging elements capture a three-dimensional color image of the front travel environment in the traveling direction, including the lane (i.e., travel lane) on which the vehicle M is traveling and the left and right boundary lines of the lane.

The image processor 23 converts a pair of analog images captured by the cameras 22a and 22b into digital images with predetermined brightness and gray scale, generates reference image data from an output signal from the main camera 22a, and generates comparative image data from an output signal from the sub camera 22b. Then, based on parallax between the reference image data and the comparative image data, the image processor 23 acquires distance data of the same target object in the two images (i.e., the distance from the vehicle M to the target object).

The lane recognizer 24 is mainly constituted of a microcomputer. The lane recognizer 24 sets the left and right boundary lines of the travel lane recognized in accordance with, for example, pattern matching on a virtual road plane generated based on the reference image data and the comparative image data transmitted from the image processor 23, and detects the distance (i.e., the lane width) between inner edges of the left and right boundary lines based on the distance data. This lane information is read by the steering support unit 11. The output side of the steering support unit 11 is coupled to the EPS motor 5.

Based on the lane information transmitted from the lane recognizer 24, the steering support unit 11 outputs a steering signal to the EPS motor 5 to cause the vehicle M to travel along the center of the lane during the ALK control. In this case, based on the steering angle θst detected by the steering angle sensor 15 and a lane curvature 1/R acquired based on the lane information, the steering support unit 11 calculates a yaw angle (vehicle-versus-lane yaw angle) Ψ of the vehicle M relative to the lane curvature 1/R (see FIG. 4). The steering support unit 11 drives the EPS motor 5 such that this vehicle-versus-lane yaw angle Ψ becomes zero. Accordingly, the vehicle M can travel along a lane curvature 1/Rl.

When the steering support unit 11 is to perform the LDP control, the steering support unit 11 first determines vehicle-versus-lane lateral acceleration from a difference between the lateral acceleration converted from the lane curvature acquired based on the lane information and the lateral acceleration estimated from the steering angle θst detected by the steering angle sensor 15, and sets this vehicle-versus-lane lateral acceleration as initial lateral acceleration. Then, the steering support unit 11 sets this initial lateral acceleration as the initial lateral acceleration ao of the control pattern illustrated in FIG. 9, drives the EPS motor 5 in accordance with this steering pattern, and generates lateral acceleration that causes the vehicle M to travel along the boundary lines by actively intervening in the steering operation, thereby suppressing lane departure.

There is inconsistency among the sensors, such as the yaw rate sensor 14, the steering angle sensor 15, and the camera unit 21, from which the steering support unit 11 acquires detection values when performing steering control. If the inconsistency among the sensors exceeds a permissible range, it is difficult for the steering support unit 11 to execute the steering control appropriately.

Thus, the input side of the steering support unit 11 is coupled to a self-diagnosis device 31 that constantly monitors whether a detection value output from each sensor is correct. If the inconsistency among the sensors exceeds a permissible value, the self-diagnosis device 31 transmits a sensor rejection signal to the steering support unit 11. If the steering support unit 11 receives a sensor rejection signal from the self-diagnosis device 31, the steering support unit 11 notifies the driver that the driving support function represented by the ALK control and the LDP control is to be interrupted.

Because the values obtained from the sensors vary in terms of units and dimensions, it is desirable that the units and dimensions be made consistent first to check whether the inconsistency among the sensors is within a permissible value. Thus, in order to compare the detection values from the sensors 14, 15, and 21 based on the same unit, the self-diagnosis device 31 extracts lateral acceleration values serving as turn components from the parameters of the sensors, extracts DC offset components from the lateral acceleration values, and checks whether a maximum deviation (i.e., maximum divergence amount) between the maximum and minimum DC offset components is within a permissible value.

Figure 3A:
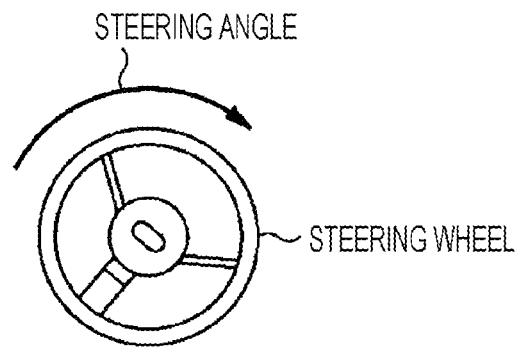
FIG. 3A illustrates a mode for estimating a turn status from a steering angle.
Figure 3B:
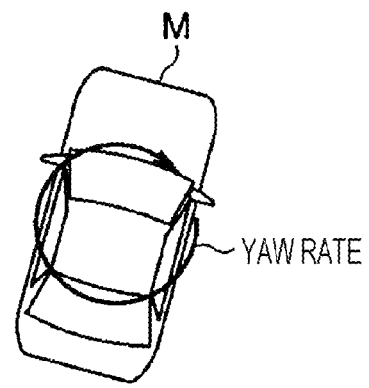
FIG. 3B illustrates a mode for estimating a turn status from a yaw rate.
Figure 3C:
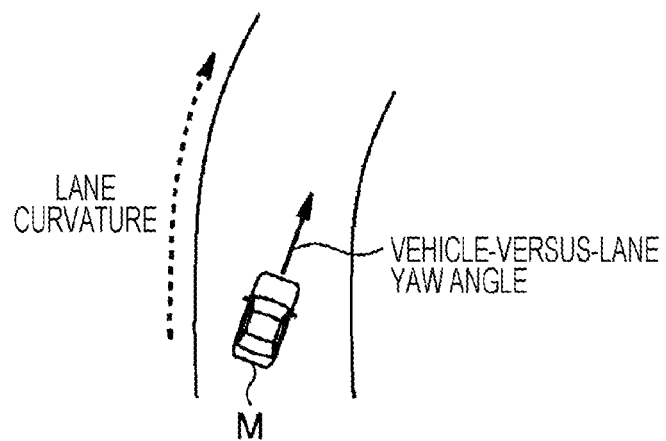
FIG. 3C illustrates a mode for estimating a turn status from an image captured by a camera.
Figure 4:
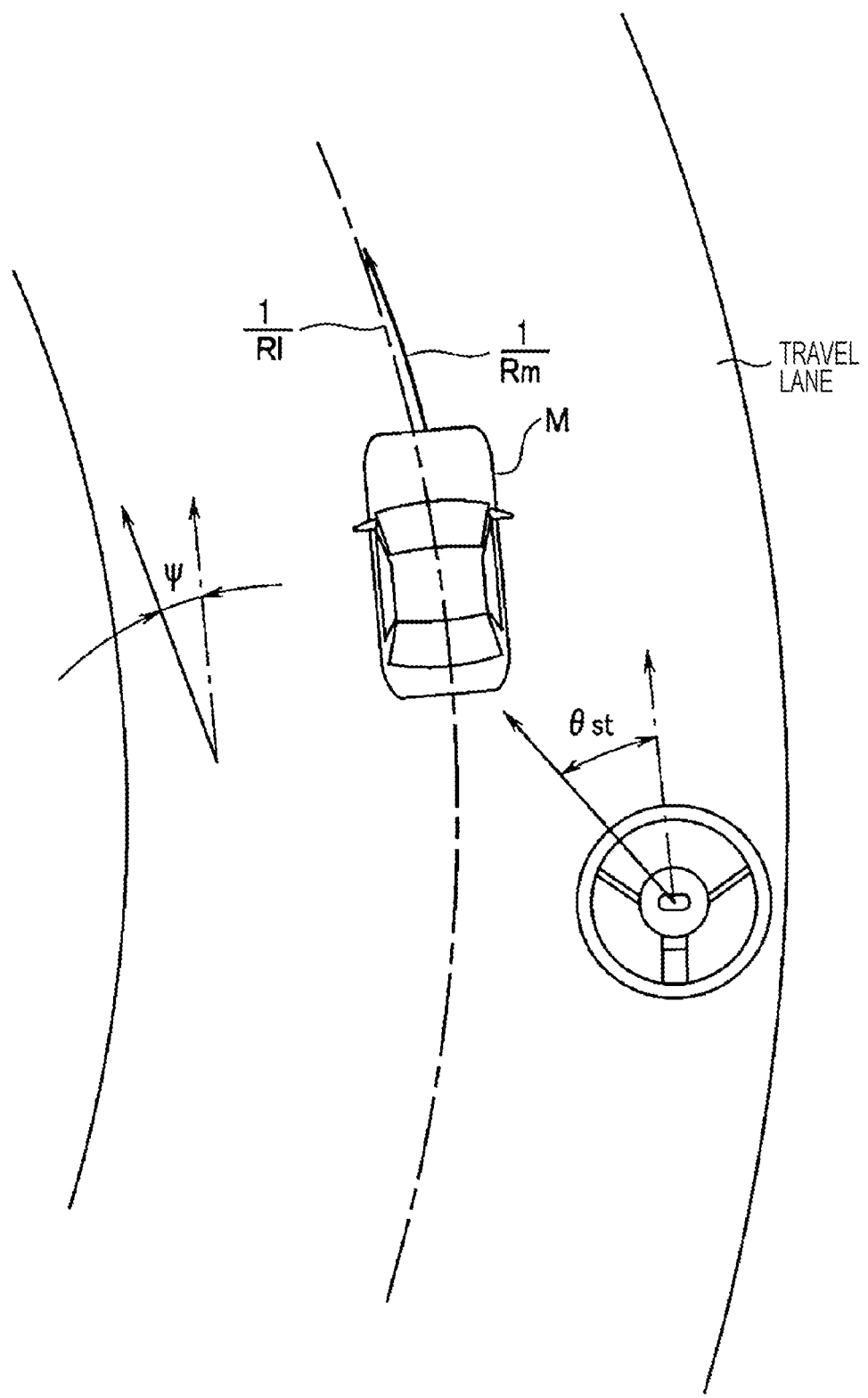
FIG. 4 illustrates the relationship between a vehicle-versus-lane yaw angle and the steering angle relative to a lane curvature.

The output values from the sensors to be compared in this embodiment are the steering angle acquired, for example, from the steering angle sensor 15 or as the rotational angle of the EPS motor 5, as illustrated in FIG. 3A, the yaw rate detected by the yaw rate sensor 14, as illustrated in FIG. 3B, and the angle (i.e., vehicle-versus-lane yaw angle) formed between the lane curvature recognized by the camera unit 21 and the front-rear direction of the vehicle M, as illustrated in FIG. 3C. These values are converted into lateral acceleration values each serving as the unit and dimension indicating the turn status.

Figure 5:
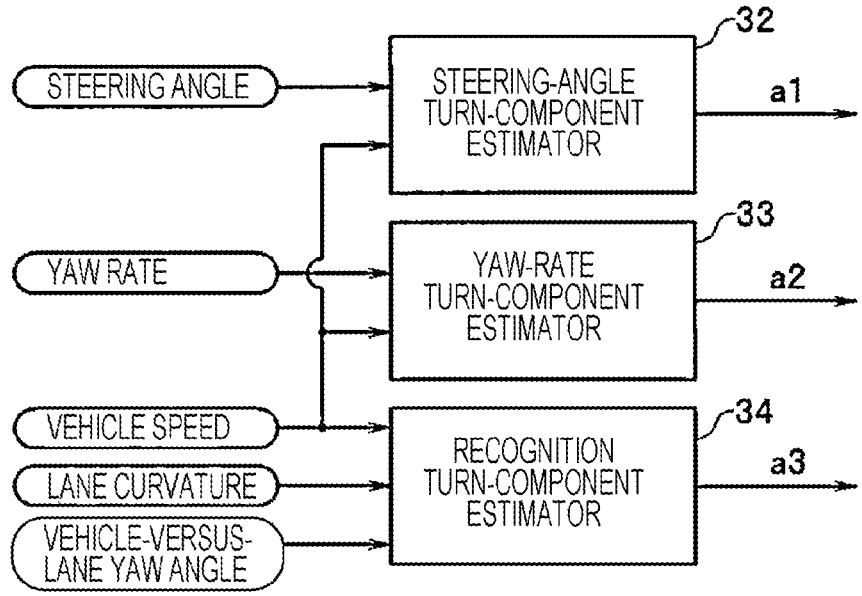
FIG. 5 illustrates a steering-angle turn-component estimator, a yaw-rate turn-component estimator, and a recognition turn-component estimator.
Figure 6:
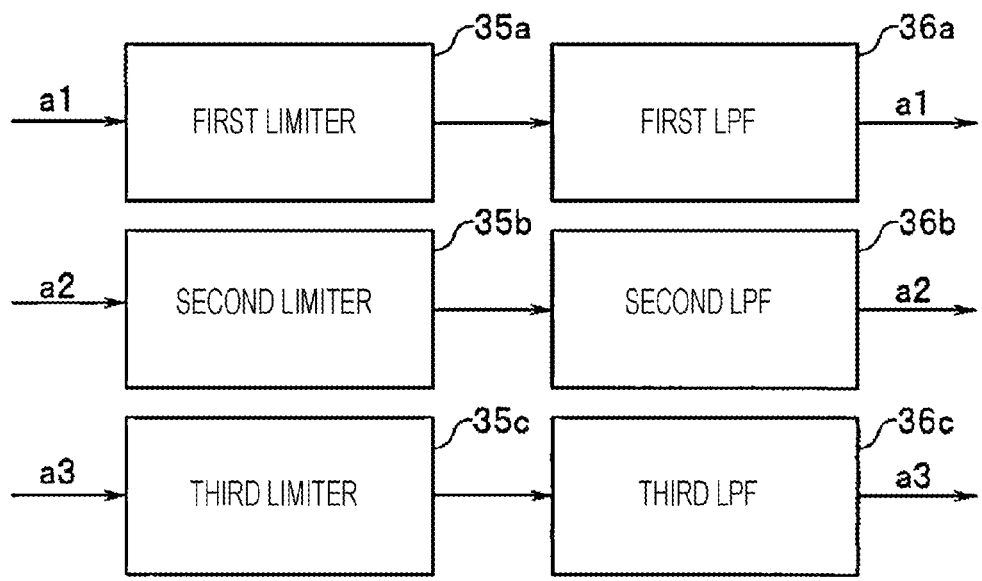
FIG. 6 illustrates limiters and low-pass filters for respective turn components.
Figure 7:
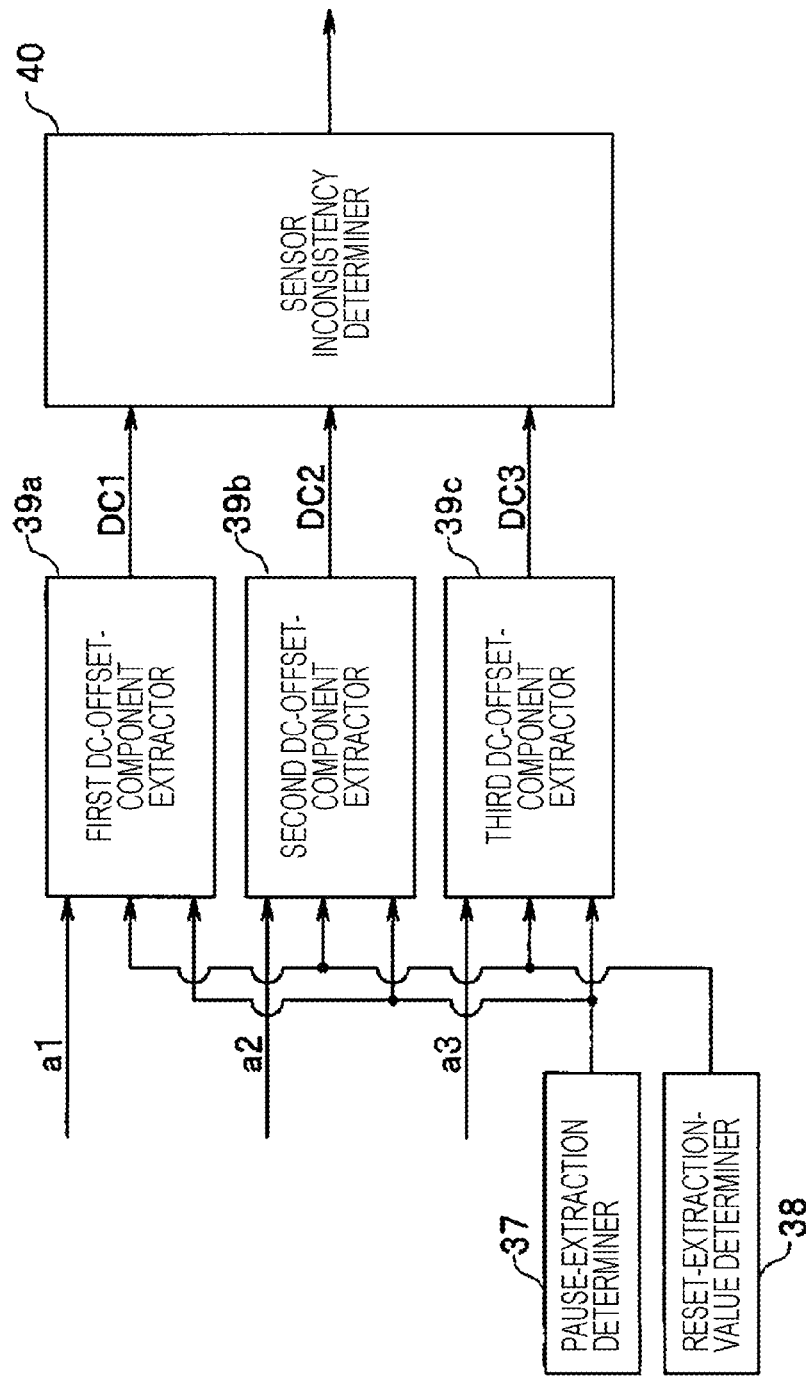
FIG. 7 illustrates DC-offset-component extractors for the respective turn components and a sensor inconsistency determiner that determines whether there is inconsistency among sensors based on extracted DC offset components.

FIG. 5 to FIG. 7 illustrate the circuit configuration of the self-diagnosis device 31. The self-diagnosis device 31 includes a steering-angle turn-component estimator 32, a yaw-rate turn-component estimator 33, a recognition turn-component estimator 34, first to third limiters 35a to 35c, first to third low-pass filters (LPF) 36a to 36c, a pause-extraction determiner 37, a reset-extraction-value determiner 38, first to third DC-offset-component extractors 39a to 39c, and a sensor inconsistency determiner 40. In one embodiment, the steering-angle turn-component estimator 32 may serve as a "first turn estimator", the yaw-rate turn-component estimator 33 may serve as a "second turn estimator", and the recognition turn-component estimator 34 may serve a "third turn estimator", and the sensor inconsistency determiner 40 may serve a "offset-divergence-amount calculator" and a "comparison unit".

In the self-diagnosis device 31, the turn-component estimators 32 to 34 first convert the detection values from the sensors 14, 15, and 21 into first to third estimated lateral acceleration values a1 to a3, respectively.

For example, the steering-angle turn-component estimator 32 searches for a preset conversion map Map based on the steering angle θst and the vehicle speed Vs, and sets a turn curvature 1/Rm [1/m] (see FIG. 4) of the vehicle M. In this conversion map Map, the turn curvature 1/Rm [1/m] defined based on the steering angle θst and the vehicle speed Vs is stored. Then, the steering-angle turn-component estimator 32 calculates the first estimated lateral acceleration value a1 based on the steering angle θst by multiplying the turn curvature 1/Rm by a squared vehicle speed $Vs^2$ (a1= $(1/Rm) \cdot Vs^2$ [m/s$^2$]).

The yaw-rate turn-component estimator 33 calculates the second estimated lateral acceleration value a2 by multiplying a yaw rate ω [rad/s] detected by the yaw rate sensor 14 by the vehicle speed Vs [m/s] (a2=ω/Vs [m/s$^2$]).

The recognition turn-component estimator 34 calculates a lane yaw rate ω1 by multiplying the lane curvature 1/R1 recognized by the camera unit 21 by the vehicle speed Vs (ω1=(1/R1)·Vs [rad/s]). Moreover, the recognition turn-component estimator 34 estimates a vehicle-versus-lane yaw rate ωΨ [rad/s] by differentiating the vehicle-versus-lane yaw angle Ψ recognized by the camera unit 21 and indicating the direction of the vehicle M relative to the lane. Then, the recognition turn-component estimator 34 adds the lane yaw rate ω1 and the vehicle-versus-lane yaw rate ωΨ together (ω1+ωΨ), and calculates the third estimated lateral acceleration value a3 by multiplying this value (ω1+ωΨ) by the vehicle speed Vs (a3=(ω1+ωΨ)·Vs [m/s$^2$]).

Subsequently, signals of the first to third estimated lateral acceleration values a1 to a3 obtained by the turn-component estimators 32 to 34 undergo limit-processing in the first to third limiters 35a to 35c, so that undesired excessive output is suppressed.

Then, the first to third LPFs 36a to 36c remove high-frequency noise components having a predetermined cutoff frequency (Max_Limt) or higher from the signals of the first to third estimated lateral acceleration values a1 to a3 that have undergone the predetermined limit-processing in the first to third limiters 35a to 35c.

Subsequently, the first to third DC-offset-component extractors 39a to 39c perform DC conversion on the signals of the first to third estimated lateral acceleration values a1 to a3, from which the predetermined high-frequency noise components have been removed, by using LPF circuits having a sufficiently low cutoff frequency. By using such LPF circuits, first to third DC offset components DC1 to DC3 (voltages) corresponding to steady-state deviations contained in the signals of the first to third estimated lateral acceleration values a1 to a3 are extracted.

Then, with regard to the extracted first to third DC offset components DC1 to DC3, the sensor inconsistency determiner 40 first determines offset divergence amounts of the first to third DC offset components DC1 to DC3, and calculates a maximum offset value (voltage) and a minimum offset value (voltage) from the offset divergence amounts.

Subsequently, a maximum deviation (i.e., maximum divergence amount) between the maximum offset value and the minimum offset value is calculated, and the maximum deviation is compared with a predetermined threshold value (i.e., permissible value). If the maximum deviation is smaller than or equal to the threshold value, it is determined that there is no inconsistency among the sensors 14, 15, and 21. If the maximum deviation exceeds the threshold value, it is determined that there is inconsistency among the sensors 14, 15, and 21.

If it is determined that there is inconsistency among the sensors 14, 15, and 21, the self-diagnosis device 31 transmits a sensor rejection signal to the steering support unit 11. If the first to third estimated lateral acceleration values a1 to a3 are normal, the DC offset components each indicate a value close to zero (i.e., a value smaller than or equal to the threshold value). However, if there is a significant deviation in any one of the first to third estimated lateral acceleration values a1 to a3, it is determined that there is inconsistency.

When the steering support unit 11 receives an inconsistency detection signal from the self-diagnosis device 31, the steering support unit 11 prompts the driver to take over the steering operation by turning off a steering standby light provided in a meter panel disposed in front of the driver seat and providing a notification indicating that the intervention in the steering operation is to be suppressed or prohibited.

Accordingly, in this embodiment, output values from a plurality of sensors in different units and dimensions are converted into values in the same unit and the same dimension to determine DC offset values (i.e., offset divergence amounts) thereof, and a maximum deviation is determined from a maximum value and a minimum value of the DC offset values. If this maximum deviation exceeds the threshold value, it is determined that there is inconsistency among the sensors. Consequently, it is possible to properly detect whether the inconsistency among the sensors that detect parameters to be used when executing the steering support function exceeds a permissible value.

The embodiment of the disclosure is not to be limited to that described above. For example, the sensors subjected to inconsistency detection may be sensors other than the yaw rate sensor 14, the steering angle sensor 15, and the camera unit 21, and may be four or more sensors.

According to the embodiment of the disclosure, the turn statuses of the vehicle are respectively estimated from the steering angle, the vehicle behavior, and the vehicle-versus-lane yaw angle, the first to third offset components are extracted from the signals indicating the estimated turn statuses, the maximum divergence amount is calculated based on the maximum value and the minimum value of the first to third offset components, and it is determined whether there is inconsistency among the first to third sensors by comparing the calculated maximum divergence amount with the predetermined threshold value. Consequently, it is possible to properly detect whether the inconsistency among the sensors that detect parameters to be used when executing the steering support function exceeds the permissible value.

The self-diagnosis device 31 illustrated in FIG. 5 to FIG. 7 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the self-diagnosis device 31 including the steering-angle turn-component estimator 32, the yaw-rate turn-component estimator 33, the recognition turn-component estimator 34, the first to third limiters 35a to 35c, the first to third low-pass filters 36a to 36c, the pause-extraction determiner 37, the reset-extraction-value determiner 38, the first to third DC-offset-component extractors 39a to 39c, and the sensor inconsistency determiner 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 5 to FIG. 7.

The invention claimed is:
1. A vehicular self-diagnosis device comprising:
a first sensor configured to detect a steering angle;
a second sensor configured to detect a behavior of the vehicle;
a third sensor configured to detect a lane curvature and a vehicle-versus-lane yaw angle;

one or more processors, electronically coupled to the first, second and third sensors; and
one or more memories storing instructions for causing the one or more processors to:
  estimate a first turn status of the vehicle based on the steering angle detected by the first sensor;
  estimate a second turn status of the vehicle based on the behavior of the vehicle detected by the second sensor;
  estimate a third turn status of the vehicle based on the lane curvature and the vehicle-versus-lane yaw angle of the vehicle relative to the lane curvature, each of which being detected by the third sensor;
  extract first, second and third offset components respectively from the estimated first, second and third turn statuses of the vehicle;
  calculate a maximum divergence amount based on a maximum value of the first, second and third offset components and a minimum value of the first, second and third offset components;
  compare the maximum divergence amount with a predetermined threshold value and determine that inconsistency exists among the first, second and third sensors in a case where the maximum divergence amount exceeds the threshold value; and
  perform a steering control of the vehicle based on the determination of inconsistency.

2. The vehicular self-diagnosis device according to claim 1,
  wherein the first, second and third turn statuses have identical units and dimensions.

3. The vehicular self-diagnosis device according to claim 2,
  wherein the first, second and third turn statuses comprise lateral acceleration.

4. The vehicular self-diagnosis device according to claim 3,
  wherein the first, second and third offset components comprise direct-current offset components generated by being passed through a low-pass filter circuit having a low cutoff frequency.

5. The vehicular self-diagnosis device according to claim 2,
  wherein the first, second and third offset components comprise direct-current offset components generated by being passed through a low-pass filter circuit having a low cutoff frequency.

6. The vehicular self-diagnosis device according to claim 1,
  wherein the first, second and third offset components comprise direct-current offset components generated by being passed through a low-pass filter circuit having a low cutoff frequency.

7. A vehicular self-diagnosis device comprising:
a first sensor, a second sensor, and a third sensor configured to detect parameters to be used in steering control of a vehicle;
one or more processors, electronically coupled to the first, second and third sensors; and
one or more memories storing instructions for causing the one or more processors to:
  estimate a first turn status of the vehicle based on a steering angle detected by the first sensor as one of the parameters;
  estimate a second turn status of the vehicle based on behavior of the vehicle detected by the second sensor as one of the parameters;
  estimate a third turn status of the vehicle based on a lane curvature and a vehicle-versus-lane yaw angle of the vehicle relative to the lane curvature, the lane curvature and the vehicle-versus-lane yaw angle each being detected by the third sensor—as one of the parameters;
  extract first second and third offset components respectively from the estimated first, second, and third turn statuses of the vehicle;
  calculate a maximum divergence amount based on a maximum value of the first, second and third offset components and a minimum value of the first, second and third offset components;
  compare the maximum divergence amount with a predetermined threshold value and determine that inconsistency exists among the first, second and third sensors in a case where the maximum divergence amount exceeds the threshold value; and
  intervene in a steering operation to cause the vehicle to travel along boundary lines defining left and right sides of a lane on which the vehicle is traveling in a case where the vehicle is estimated to deviate from the lane, wherein
  in a case where the one or more processors determine that the inconsistency exists among the first, second and third sensors, the one or more processor suppress or prohibit the intervention in the steering operation.

8. The vehicular self-diagnosis device according to claim 7,
  wherein the first, second and third turn statuses have identical units and dimensions.

9. The vehicular self-diagnosis device according to claim 8,
  wherein the first, second and third turn statuses comprise lateral acceleration.

10. The vehicular self-diagnosis device according to claim 9,
  wherein the first, second and third offset components comprise direct-current offset components generated by being passed through a low-pass filter circuit having a low cutoff frequency.

11. The vehicular self-diagnosis device according to claim 8,
  wherein the first, second and third offset components comprise direct-current offset components generated by being passed through a low-pass filter circuit having a low cutoff frequency.

12. The vehicular self-diagnosis device according to claim 7,
  wherein the first, second and third offset components comprise direct-current offset components generated by being passed through a low-pass filter circuit having a low cutoff frequency.

13. A vehicular self-diagnosis device comprising:
a first sensor configured to detect a steering angle;
a second sensor configured to detect a behavior of the vehicle;
a third sensor configured to detect a lane curvature and a vehicle-versus-lane yaw angle;
a circuitry electronically coupled to the first, second and third sensors and configured to
  estimate a first turn status of the vehicle based on the steering angle,
  estimate a second turn status of the vehicle based on the behavior of the vehicle, estimate a third turn status of the vehicle based on the lane curvature and the vehicle-versus-lane yaw angle of the vehicle relative to the lane curvature, extract first, second and third offset components respectively from the estimated first, second and third turn statuses of the vehicle, calculate a maximum divergence amount based on a maximum value and a minimum value of the first, second and third offset components, and compare the calculated maximum divergence amount with a predetermined threshold value and determine that inconsistency exists among the first, second and third sensors in a case where the maximum divergence amount exceeds the threshold value; and perform a steering control of the vehicle based on the determination of inconsistency.

\* \* \* \* \*